United States Patent [19]

Hernandez et al.

[11] Patent Number: 5,446,261
[45] Date of Patent: Aug. 29, 1995

[54] SOLDER APPLICATION SYSTEM USING HELIX TO CONTROL SOLDER MENISCUS

[75] Inventors: Bernardo Hernandez, Norwalk, Conn.; Raymond R. Horton, Dover Plains, N.Y.; Michael J. Palmer, Walden, N.Y.; Ismail C. Noyan, Yorktown Heights, N.Y.; Frederick G. Weindelmayer, Manassas, Va.

[73] Assignee: International Business Machines Corporation, Armonk, N.Y.

[21] Appl. No.: 148,451

[22] Filed: Oct. 26, 1993

[51] Int. Cl.6 .............................................. H05B 3/42
[52] U.S. Cl. .................................. 219/230; 219/229; 228/52; 239/602; 222/593; 222/527
[58] Field of Search ............... 219/230, 229, 231, 236, 219/241, 242, 85.16; 228/51–55; 401/119, 118, 261, 1, 2; 222/593, 591, 420, 527; 239/602

[56] References Cited

U.S. PATENT DOCUMENTS 2,380,138  7/1945  Abramson .
3,121,156  2/1964  Kamborian ........................ 219/230
4,934,309  6/1990  Ledermann et al. .

FOREIGN PATENT DOCUMENTS 248832  2/1926  Italy ........................................ 401/2
4-66270  3/1992  Japan ..................................... 228/51

Primary Examiner—John A. Jeffery
Attorney, Agent, or Firm—Whitham, Curtis, Whitham & McGinn; Michael E. Belk

[57] ABSTRACT

A soldering tip overcomes the gravitational effects on molten solder and supplies a large molten solder sphere for contact with a surface to which solder is to be applied. A conical or cylindrical spiral or helix of solder-wettable material, preferably in the form of a compressional spring is attached to the soldering tip with the central axis of the helix aligned with the axis of the soldering tip, preferably by welding. Solder supplied to the soldering tip flows between the coils of the helix and forms a meniscus at the lower end of the helix so that only the molten solder meniscus touches the surface during application of solder. The increased surface tension acts to overcome gravitational effects and assures a more even flow of solder to the surface.

13 Claims, 5 Drawing Sheets

SOLDER APPLICATION SYSTEM USING HELIX TO CONTROL SOLDER MENISCUS

FIELD OF THE INVENTION

This invention relates to an improved system of solder application. More particularly, the invention provides an improved technique whereby a substantially uniform amount of solder is deposited on each pad.

BACKGROUND OF THE INVENTION

Solder application tools are well known in the prior art. In their least complex form, as illustrated in FIG. 1, the tool is comprised of a soldering tip (1) which is heated above the melting point of the solder. The soldering tip is held against, or near, the surface on which the solder is to be deposited (5). The solder, generally in wire form, (3) is placed against the soldering tip. The solder heats, and melts, running down the tip, and forming a meniscus (7). The meniscus is then brought in contact with the surface (5).

Somewhat more complex solder tools have heated reservoirs for the solder. These tools have nozzles through which the molten solder flows and which can be used to direct the solder deposit. An early form of such a soldering application tool can be found in U.S. Pat. No. 2,380,138, Abramson, "Solderer or Lead Tool." A somewhat later and more complex version is described in U.S. Pat. No. 4,934,309, Ledermann et al, "Solder Deposition System."

In applications such as the fabrication of computer modules, in which very precise soldering (on the order 0.002 inch wide pads on 0.004 inch centers) is required, it is critical that the solder tip of the tool be a specific distance from the pads (or surfaces to be coated) when the solder meniscus contacts and delivers solder to these pads. If the meniscus is too far from the surface to be soldered, the solder coating may not be even or too little solder may be deposited to ensure an adequate joint. If the meniscus is too close to the surface, too much solder may be deposited and it may flow in unwanted directions causing pad bridging.

In ordinary operation, as a natural result of gravity, each pad removes a finite amount of solder from the tip of the meniscus. This reduces the volume of solder at the point of contact, so that the solder meniscus will no longer be at the correct distance, will no longer contact the pads, and will not coat them sufficiently for adequate joins.

As a result, in prior art, considerable effort was expended in trying to compensate for the change in the volume of solder. Since part of the problem would be solved by providing an equal, constant amount of solder (essentially an "infinite" supply) during the soldering process, many of these efforts in the prior art concentrated on providing a reliable solder feed mechanism. Examples of this approach can be found in commercially available solder application tools such as the IBM Solderfoot ™ (Trademark International Business Machines Corporation) or the Apollo Seiko Automatic Soldering Unit (Digital Apoauto Model). Generally, these tools use complex solder feed mechanisms and, as a result, are both costly and have a relatively large number of parts that are subject to malfunction.

OBJECTIVES OF THE INVENTION

Accordingly, it is an objective of the invention to provide an improved solder application tool.

It is a further objective of the invention to provide a relatively infinite and constant volume of molten solder at the tip of a soldering iron to ensure that a sufficient and uniform coating of solder is supplied to the pads.

It is a further objective of the invention to provide an improved solder application tool without significantly adding to the complexity or cost of the tool.

SUMMARY OF THE INVENTION

These and other objectives of this invention are accomplished by means of a tool which overcomes the effect of gravitational forces and supplies a large molten solder sphere of constant size at the tip of the tool. The tool comprises of a standard solder application tool in which a spring has been welded to the free end of the soldering iron tip, so that the central axis of the spring is substantially aligned with the central axis of the soldering tip. The spring is a compression spring of solder wettable materials. When the solder is brought in contact with the spring, it flows down the coils and forms a meniscus at the base of the spring. The increased surface area of spring wire diameter and coils allows the increased surface tension of the meniscus to act to overcome the gravitational forces acting on the molten solder mass and ensures a more even flow of solder to the pad, situated on the surface of a work piece, on which the solder is to be deposited.

The invention is more fully described and may be more easily understood by referring to the drawings and description below.

DETAILED DESCRIPTION OF THE CURRENT EMBODIMENT

The invention may be employed in a hand-held soldering iron(as, for example, the CooperTools hand-held Weller ™ ) or in an automated solder application tool (as, for example, the IBM Solderfoot ™ tool or the Apollo Seiko Automatic Soldering Unit Digital Apoauto Model).

Figure 2A:
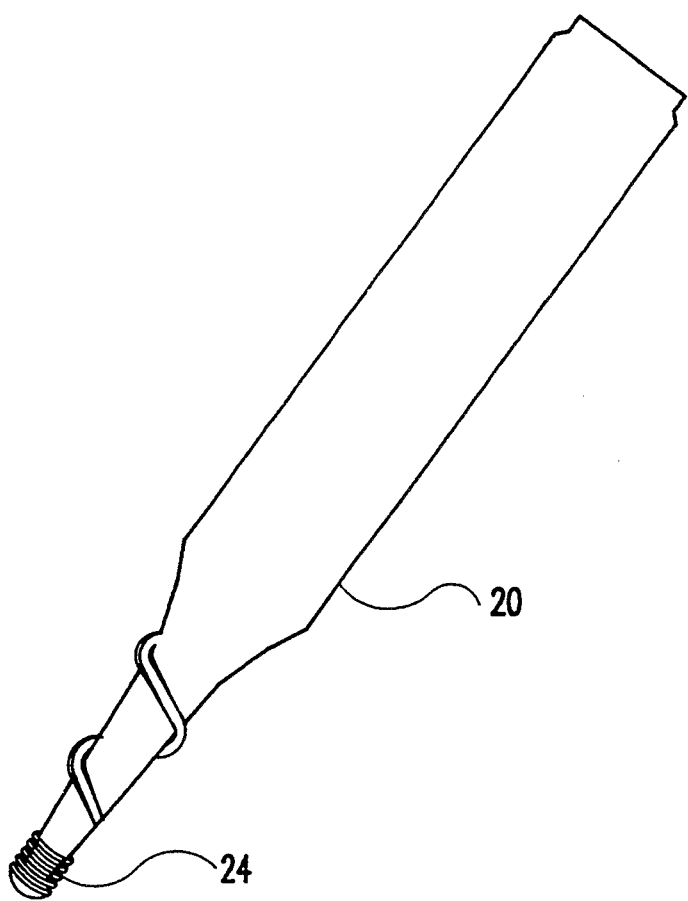
FIG. 2A illustrates the current embodiment of the invention.
Figure 2B:
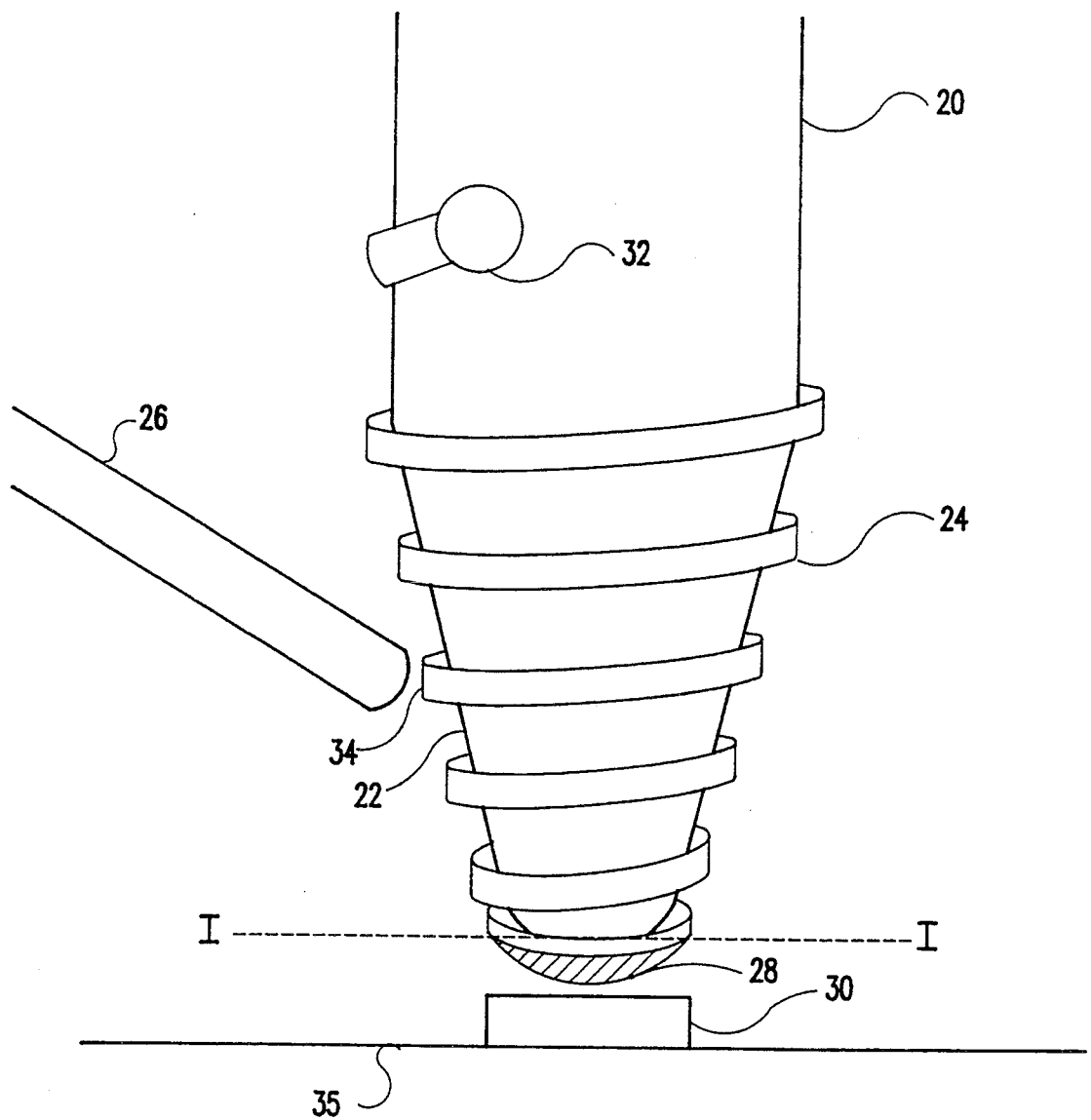
FIG. 2B is a schematic of the current embodiment of the invention, (not to scale) showing the detail of the solder tip, spring and solder meniscus in the act of applying solder to a pad.

In the current embodiment, the tool is comprised of a standard solder application tool having a soldering tip. FIG. 2A provides a picture of the current embodiment, showing the relative size of the solder tip (20) and spring (24). FIG. 2B is a schematic of the current embodiment which is not drawn to scale and where the distances between the spring coils, distance between the solder tip and spring coils, distance between the solder and coil, and meniscus have been drawn so as to assist understanding but not convey actual size or distances. Referring to FIG. 2B, it may be seen that a spring (24) has been welded to the free end (22) of the soldering iron tip (20), so that the central axis of the spring is substantially aligned with the central axis of the soldering tip. In the current embodiment, one end of the spring was spot welded to a point (32) approximately midway up the free end of the soldering iron tip.

The spring is a compression spring of solder wettable materials. In the current embodiment, the spring was formed of heat conductive material with a melting point higher than the melting point of solder. More specifically, in the current embodiment, the spring was formed of stainless steel which is treated with flux to initialize the wetting between the solder and spring. Commercially available Dunton's Nokorode stainless steel flux may be used to provide a wettable surface. Alternately, a nickel spring can be wet with solder using Alphametals RMA376EHLV flux.

Figure 2C:
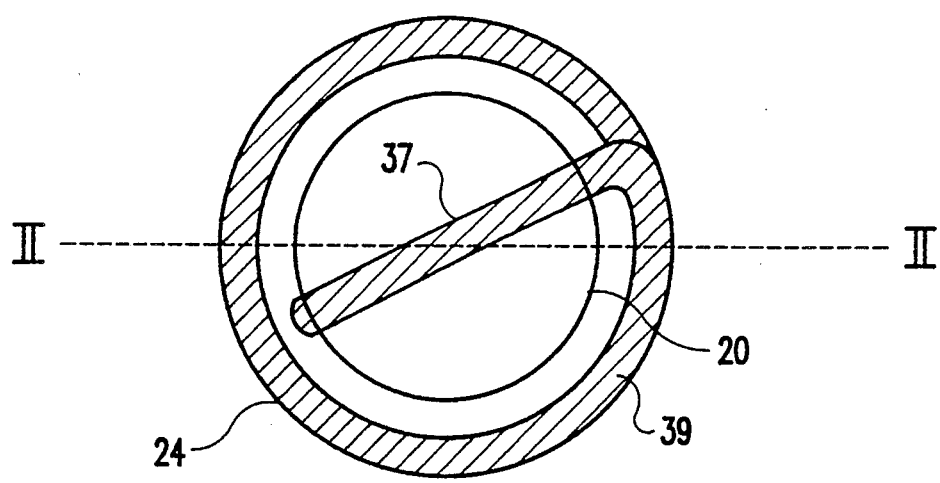
FIG. 2C is a cross section of the solder tip and spring taken along axis I—I of FIG. 2B.

The diameter of the spring coil (that is, the distance across the spring taken along the axis II—II of FIG. 2C) is chosen so that it is consistent with the diameter of the soldering tip at the point that it is spot welded. This diameter provides a capillary path between the solder iron tip and the inside diameter of the spring and yet allows the free end of the solder tip to fit easily within the spring. In the current embodiment, there is 0.030 inches between the coils of the spring and the solder tip.

In accordance with this invention, solder in this embodiment is deposited in the following manner. Referring to FIG. 2B, solder (26), in wire form, or other form through a dispensing outlet similarly located is brought in contact with the outer edges (34) of the coils of the spring (24). The lowermost coil of the spring is positioned adjacent to the pad (30) on which the solder is to be deposited. The distance from the coil to the pad, 0.030 inches, is maintained so that contact to the pad does not occur. The heater 50 in the tool heats the tip and the spring and, accordingly, melts the solder in contact with the spring to form a liquid mass. The liquid solder flows down the coils of the spring, forming a meniscus (28) at the base of the spring. The increased surface tension of the meniscus at the base of the spring acts to overcome the gravitational forces acting on the molten solder mass and ensures a more even flow of solder to the pad (30), situated on the surface of a work piece (35).

It will be noted that the solder may be brought into contact with any point of the spring or even the solder iron tip.

A second embodiment of the invention is shown in FIG. 2C. FIG. 2C is a cross section of the solder tip (20) and spring (24) taken along axis A—A of FIG. 2B. The spring is shaded in FIG. 2C to assist understanding. As can be seen from FIG. 2C, in this embodiment, the free end of the spring (37) (i.e. the end opposite the end that was spot welded) was bent inward. Thus, the line formed by the free end intersects the circle (39) formed by the coils of the spring. This embodiment was found to improve performance where the diameter of the solder tip was relatively large.

Figure 2D:
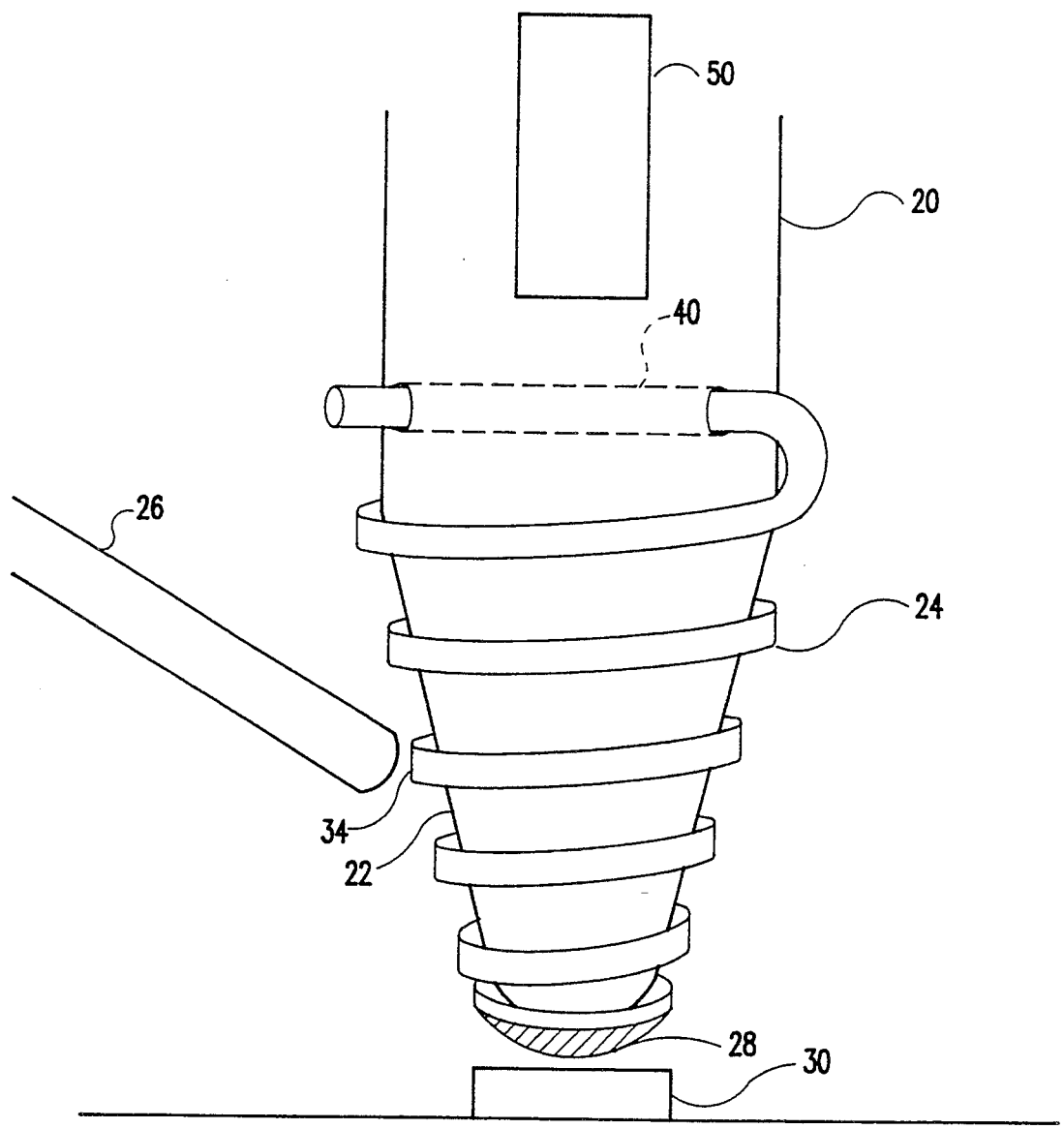
FIG. 2D illustrates an alternate spring attachment.

It will also be noted that alternate methods may be used to attach the spring to the soldering iron tip. FIG. 2D illustrates one alternate spring attachment technique. As shown in FIG. 2D, a hole (40), which is larger in diameter than the spring wire diameter (in the current embodiment the hole was 0.010 inches larger than the spring wire diameter) is drilled through the tip (20) at point (36). The spring (24) is fed through the hole (40) to insure correct position and to allow for heat transfer by conduction and convection. The use of spot welding assured that the spring would remain correctly positioned and, in addition, provides an additional thermal path for the heat from the tip to the spring.

It will also be noted that other heat conductive materials may be used for the spring composition.

While the current embodiment has been discussed in the context of using a spring, any spiral or helix shaped device may also be used. An alternative to the spring, namely a cylinder pierced with holes or made of mesh, attached to the soldering iron tip so that the central axis of the cylinder is approximately parallel to the central axis of the tip, is also possible.

Increased control of the volume of solder (or size of meniscus) at the free end of the spring is provided by varying the winding center to center distance and the total number of the turns or coils of the spring. In general, increasing the number of turns provides additional surface area and increases the total solder volume available. This volume is critical in supplying an essentially "infinite" reservoir of solder. In certain cases, a conical or "stepped down" cylindrical spring (i.e, one having a thick barrel above and a thin snout below) may be used to ensure that there is enough solder and that the tip area is commensurate with the deposition surface.

Figure 1:
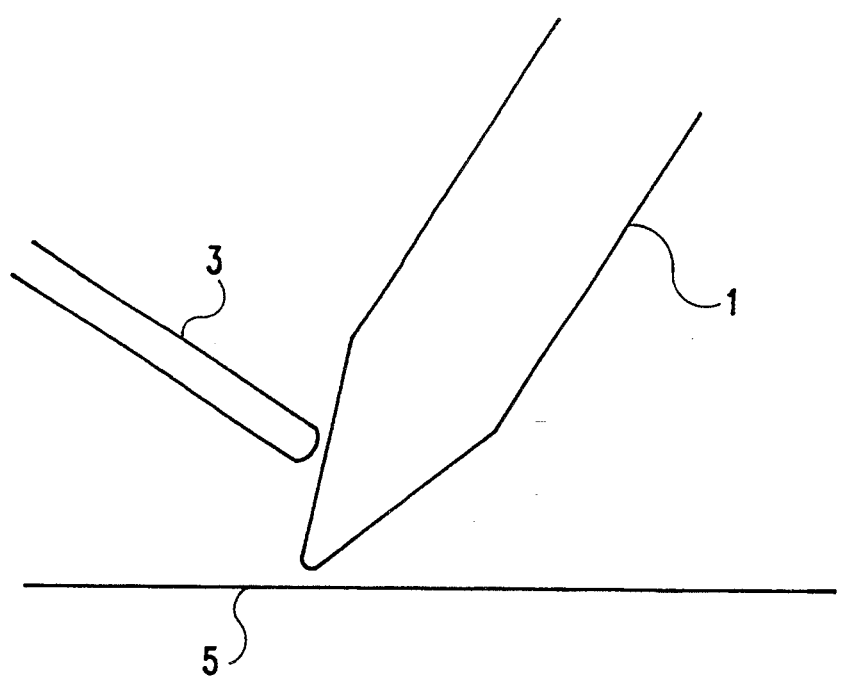
FIG. 1 illustrates a prior art solder tip applying solder to a pad.

The invention may also be used with soldering application tools in which the solder is melted in a reservoir within the tool (as is described in U.S. Pat. No. 4,934,309, Ledermann et al, Column 5, lines 33–46), rather than being held externally and brought into contact with the exterior of the soldering iron tip (as illustrated in FIG. 1 ).

In certain cases, inert gas jets (such as forming gas, nitrogen, argon, etc.,) may be employed to provide a cover gas to the spring such that the solder in the reservoir does not oxidize. This function can also be accomplished by delivering flux to the cylinder through the use of an external fluxing tube, the use of flux cored solder, or periodic manual application of flux to the tip.

Through use of this invention, a sufficient, uniform, essentially "infinite" amount of molten solder can be constantly supplied to the contact pads. Further, this benefit is provided without costly or complex additions to existing soldering tools.

While the invention has been described with respect to particular embodiments detailed above, it would be understood by those skilled in the art that modifications may be made without departing from the spirit and scope of the present invention. The described embodiments are for purposes of example and illustration only and are not to be taken to limit the scope of the invention narrower than the scope of the appended claims.

What is claimed is:

1. An apparatus for applying liquid solder to conductive surfaces comprising:
    a soldering iron tip, said soldering iron tip having a free end an a central axis,
    heating means for heating said soldering iron tip, and
    a helix having an upper end, a lower end and a central axis, and a plurality of coils having a distance therebetween, one of said coils being a lowermost coil, said upper end of said helix attached to said soldering iron tip and said helix disposed about said free end of said soldering iron tip so that said central axis of said helix is substantially parallel to said central axis of said soldering iron tip and forming a capillary path for said liquid solder between said coils and said soldering iron tip.

2. An apparatus as in claim 1 further comprising means for delivering solder to said soldering iron tip and said helix, wherein said heating means heats said soldering iron tip and said helix, melting said solder and said solder flows down said helix to said lower end of said helix forming a meniscus.

3. An apparatus as in claim 2 wherein said means for delivering solder is comprised of a dispensing outlet whereby said solder is directed against said plurality of coils of said helix.

4. An apparatus as in claim 2 wherein at least said lowermost coil of said helix extends beyond the free end of said soldering iron tip.

5. An apparatus as in claim 2 wherein said helix formed of heat conductive material with a melting point higher than the melting point of solder.

6. An apparatus as in claim 2 wherein said helix is a compression spring.

7. An apparatus as in claim 2 wherein said lower end of said helix is bent inward, across said lowermost coil.

8. An apparatus as in claim 1 wherein at least said lowermost coil of said helix extends beyond the free end of said soldering iron tip.

9. An apparatus as in claim 1 wherein said helix formed of heat conductive material with a melting point higher than the melting point of solder.

10. An apparatus as in claim 1 wherein said helix is a compression spring.

11. An apparatus as in claim 1 wherein said lower end of said helix is bent inward, across said lowermost coil.

12. An apparatus as in claim 1 wherein at least one of said plurality of coils has a diameter which is greater than a diameter of said lowermost coil.

13. An apparatus as in claim 1 wherein at least one of said plurality of coils has a diameter which is greater than a diameter of said lowermost coil.

* * * * *